United States Patent [19]

Prakken

[11] Patent Number: 4,611,458

[45] Date of Patent: Sep. 16, 1986

[54] DEVICE FOR PACKING FILLED BAGS INTO BOXES

[76] Inventor: Bouwe Prakken, Spijkerlaan 9, 3471 EG Kamerik, Netherlands

[21] Appl. No.: 726,697

[22] Filed: Apr. 24, 1985

[30] Foreign Application Priority Data

May 4, 1984 [NL] Netherlands .................. 8401437

[51] Int. Cl.⁴ .............................................. B65B 5/08
[52] U.S. Cl. ....................................... 53/537; 53/247; 53/251
[58] Field of Search ................ 53/247, 537, 251, 250, 53/531, 540; 198/429, 432

[56] References Cited

U.S. PATENT DOCUMENTS 3,774,778  11/1973  Flaig .................................. 214/1 BT
4,199,050   4/1980  Moller .............................. 53/247 X

FOREIGN PATENT DOCUMENTS 1950625   6/1970  Fed. Rep. of Germany .
2240541   5/1973  Fed. Rep. of Germany .
2079381  12/1971  France .
7411732   9/1974  Netherlands .
7800542   1/1978  Netherlands .
2092090   8/1982  United Kingdom .

Primary Examiner—James F. Coan
Attorney, Agent, or Firm—Finnegan, Henderson, Farabow, Garrett & Dunner

[57] ABSTRACT

A device for packing filled bags of low weight into boxes comprises a suction box (1) movable along a horizontal track between a pick-up position and a delivery position. The suction box is provided with a number of suction cups (2). To avoid the problem of bags falling from the suction cups or not taken up by these cups the device comprises means (17, 18, 19) for pushing the bags upwards against the suction cups.

4 Claims, 3 Drawing Figures

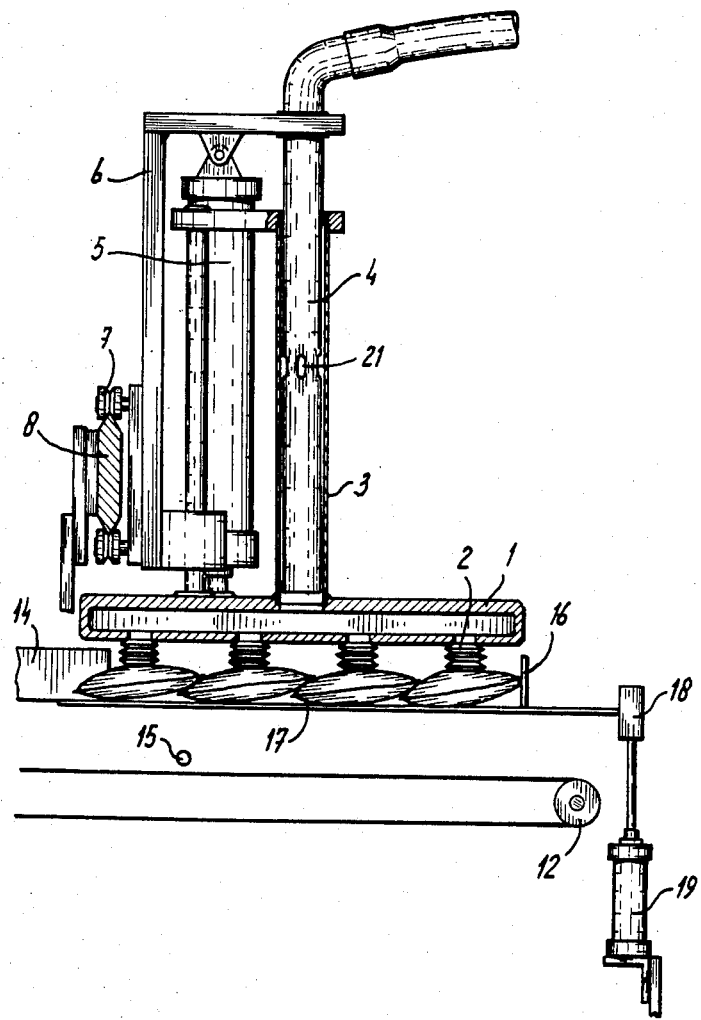

DEVICE FOR PACKING FILLED BAGS INTO BOXES

The invention relates to a device for packing filled bags into boxes, in particular bags filled with crisps.

Bags of crisps are normally packed into boxes by hand. Accurate mechanical or pneumatic handling of such bags gives problems, owing to their low weight. During picking up of a row of bags by suction there is a relatively great risk that one or more of the bags will not be taken up or will fall from the suction heads.

The object of the invention is to avoid this problem, and to this end a device of the type specified in the preamble comprises a suction box which is provided with a number of suction cups and is movable along a horizontal track between a pick-up position above a device for feeding in or forming a row of bags and a delivery position above a box or device for the feeding in thereof, and means for pushing the fed-in or formed row of bags upwards against the suction cups.

In particular due to the fact that a row of bags once formed is not lifted from the stationary position by the suction box, but is quickly pushed upwards against the suction cups, it practically never happens that bags are left behind or fall from the suction box.

The bags are deposited one by one on a conveyor, which moves in stages to form a row of bags. The conveyor could be moved upwards in its entirety in the direction of the suction box, but in order to move this row of bags in a simple manner against the suction cups without having to take up the whole conveyor, the device for feeding in or forming a row of bags is provided with a set of adjacent conveyor belts with spaces between them, while disposed between said belts or teeth which are movable vertically between a resting position in which they are between the conveyor belts and a pressing position in which they have arrived above the conveyor belts to push the bags against the suction box.

The suction box will be movable vertically by means of a pneumatic or hydraulic piston-cylinder unit. This vertical movement is necessary in particular for depositing each row accurately in a box.

Means are preferably provided for automatically breaking the vacuum in the suction box when the latter is at a particular low position.

In order to prevent the light bags from floating away when the vacuum is broken, one can make the stroke of the piston-cylinder unit such that the suction box is still on its downward journey when the vacuum is broken.

For easy breaking of the suction effect, a suction pipe provided with an opening projects in a sealed-off manner into the pipe leading to the suction box.

In order to fill a box as full as possible, it is desirable for both the bags in a row and the rows themselves to be slightly overlapping.

The overlapping of the bags in a row is achieved if the device has a feed conveyor for feeding in bags one by one to one end of the conveyor belts for forming a row, and to control the movement of said belts there is a photoelectric cell unit for moving the belts constantly over a settable distance which is smaller than the width of the bags.

The overlapping of the rows in a layer in the box can be achieved by having along the horizontal track of the suction box settable sensors or switches which control the movement distances of the suction box in such a way that the row of bags which have landed in a packing box overlap.

The invention will be explained in greater detail with reference to the drawings, which illustrate an example of an embodiment.

FIG. 3 shows a front view comparable with that of FIG. 2, but where the bags are pressed against a suction box.

Figure 1:
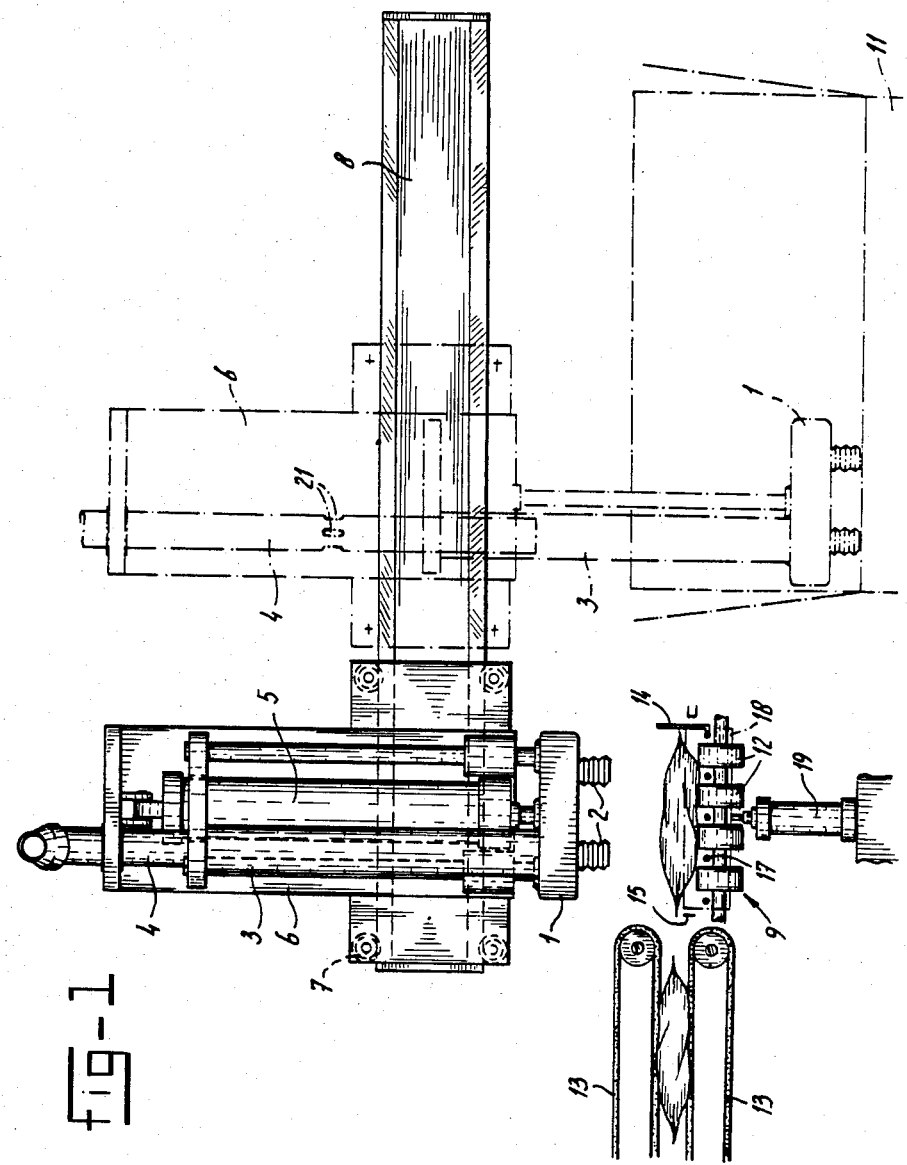
FIG. 1 shows a side view of the device.
Figure 2:
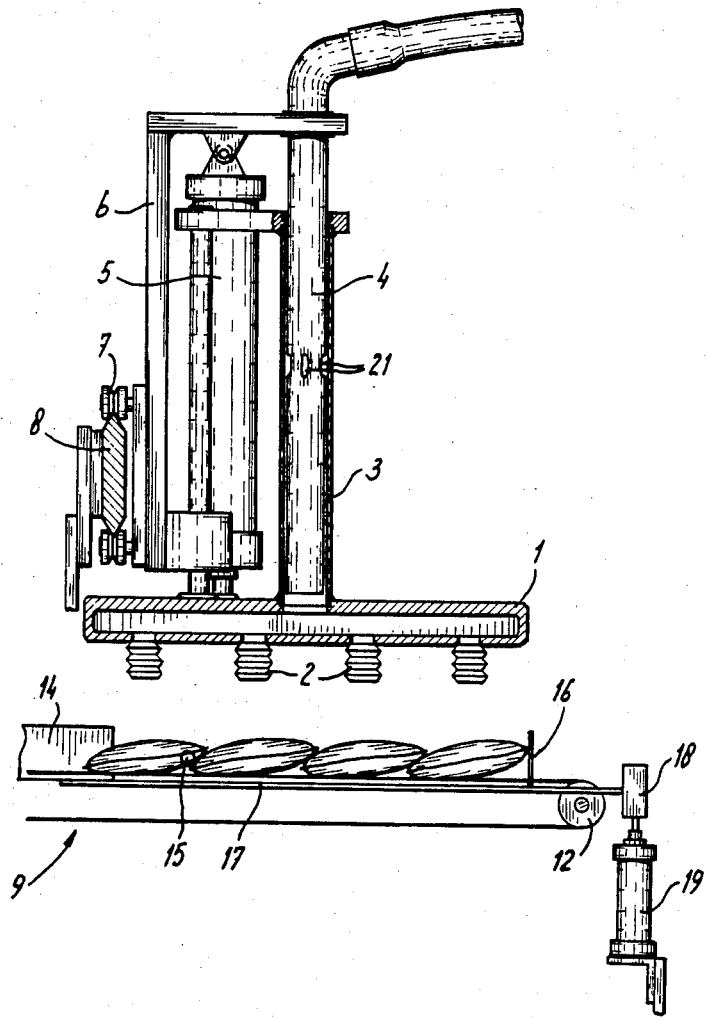
FIG. 2 shows a front view of the device, where the bags are on the conveyor device forming the row.

The device illustrated is intended for arranging filled bags in a row, picking up each row individually, moving it and depositing it into a packing box.

The device comprises a suction box 1 provided with a number of suction cups 2. Into the suction box debouches a pipe 3, into which projects a suction line 4 which is connected to a suction pump. The suction box is suspended from the piston rod of a hydraulic cylinder unit 5, which is fixed to a frame 6. This frame has wheels 7 which glide along a rail 8. The movement of the frame 6 permits horizontal movement of the suction box 1, and the sliding out and in of the cylinder rod of the cylinder unit 5 permits vertical movement of said suction box.

The horizontal movement of the suction box takes place between a pick-up position (solid lines in FIG. 1) in which the suction box is above a device 9 for arranging the bags in a row, and a delivery position (shown by dotted and dashed lines in FIG. 1) in which the suction box is above a packing box 11.

The device 9 comprises a set of narrow conveyor belts 12 disposed with spaces between them. At one end thereof is a double feed conveyor 13 covered with soft foam material, which ensures that each bag is projected at sufficiently high speed onto one end of the conveyor belts 12. Flying off said belts 12 is prevented by a stop plate 14.

A photoelectric cell 15 with accompanying light source is set up in such a way that the light beam is interrupted when a bag is fed onto the end of the conveyor belts. This causes a signal to be given to the drive of the belts 12, as a result of which the bag is moved to the right. As soon as the light beam is received again by the photoelectric cell, the belts 12 will stop again. The distance between the cell 15 and the left end of the conveyor belts 12 is smaller than the width of a bag. The bags in a row will therefore overlap.

As soon as a row of four bags has collected on the conveyor belts 12 and the first bag in the first row comes into contact with a stop plate 16, a mechanism is set in motion to push the row positively against the suction cups 2 of the suction box 1. This mechanism comprises a system of rods 17 which are connected at one end to a frame 18 which can be moved up and down by a hydraulic cylinder 19.

In the lowest position of the rods 17 shown in FIG. 1, they are below the level of the conveyor face of the belts 12. In the highest position the rods 17 have clearly come out above this level, and the row of bags is lifted off the belts 12 and taken up against the suction cups 2. The upward movement of the row of bags against the suction cups 2 has the beneficial effect of reducing to a minimum the risk of bags not (or not adequately) being gripped by the cups 2.

It is also not out of the question for the conveyor for forming a row of bags to comprise one single conveyor which is raised in its entirety. In that case there will, of course, be no rods 17. However, the illustrated embodiment with the rods 17 extending between the narrow belts (12) is simpler and more reliable.

When a row of bags has been pressed by the rods 17 against the suction cups 2, the frame 6 is moved horizontally to a position above the open box 11. According to the number of rows to be placed after each other per layer in the box, the suction box can be taken to a number of positions above the packing box. These positions are determined by settable sensors or switches along the rail 8.

When a row has been taken to the desired position above the packing box, the cylinder 5 is operated so that the suction box moves downwards. An opening 21 is fitted in the line 4. As soon as the top edge of the pipe 3 has passed this opening 21 during the downward movement of the suction box 1, the vacuum in the suction box 1 and the suction cups 2 is broken, so that the bags are released from the suction cups. This moment is chosen before the downward stroke of the suction box is completed, which is not the case until this suction box has reached the top edge of the packing box 11 (FIG. 1). The bags are therefore flung into the packing box 11 at some speed, which eliminates the floating effect caused by the low weight of the bags. The row of bags therefore falls into the packing box as a complete row.

The above-mentioned settable sensors or switches along the rail 8 are set in such a way that the rows overlap in the box. As a result of the overlapping of the bags per row and of the rows per layer, the packing box 11 can be filled as full as possible.

Many modifications are possible according to the invention. What is important for the working of the device is that the bags should be pressed positively against the suction cups 2, that when they are going into the packing box 11 the bags are moved at a certain initial speed, and that the bags in a row and the rows in a layer overlap.

As a result of this, the reliability of the device and the filling level of the packing boxes will be high.

I claim:

1. A device for packing filled bags into boxes, in particular bags filled with crisps, said device comprising a suction box having a plurality of suction cups, first means for moving said suction box vertically, second means for moving said suction box along a horizontal track between a bag pick-up position and a bag delivery position, a plurality of spaced-apart conveyor belts adapted to support and move a plurality of bags formed in a row on said plurality of conveyor belts to said pick-up position, means for arranging said bags in said row on said spaced-apart conveyor belts, means disposed between said space-apart conveyor belts for pushing and positioning said row of bags at said pick-up position against said suction cups for gripping by said suction cups.

2. The device of claim 1 wherein a fixed suction pipe communicates with said suction box through a suction line opening into said suction box at one end thereof connected to said suction box and an opening in said fixed suction pipe adapted to extend beyond another end of said fixed suction pipe upon movement of said suction box vertically from said bag delivery position to terminate application of suction by said suction cups to said bags.

3. The device of claim 1 or 2 wherein said means disposed between said spaced-apart conveyor belts for pushing and positioning said row of bags at said pick-up position against said suction cups includes a plurality of rods extending longitudinally between said spaced-apart conveyor belts.

4. The device of claim 1 or 2 having a conveyor for feeding bags individually to one end of said plurality of spaced-apart conveyor belts to form said row, means for controlling movement of said plurality of spaced-apart conveyor belts in response to bags being fed thereto by said feed conveyor for overlapping said plurality of bags formed in said row.

* * * * *